United States Patent
Blake, III et al.

(10) Patent No.: US 7,302,962 B2
(45) Date of Patent: Dec. 4, 2007

(54) VEHICLE PRESSURE RELIEF VALVE HAVING PERIPHERALLY SECURED FLAPS AND METHOD OF MANUFACTURING THE SAME

(75) Inventors: Thomas E. Blake, III, South Lyon, MI (US); David Call, Sterling, MA (US); Brenda Schworer, Barre, MA (US); Daniel D. Carlson, Fenton, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 211 days.

(21) Appl. No.: 10/686,212

(22) Filed: Oct. 15, 2003

(65) Prior Publication Data

US 2005/0081921 A1   Apr. 21, 2005

(51) Int. Cl.
*F16K 15/16* (2006.01)
*B60H 1/24* (2006.01)

(52) U.S. Cl. .............................. 137/15.18; 137/512.1; 137/512.15; 137/852; 137/859; 454/162

(58) Field of Classification Search ............. 137/512.1, 137/512.15, 859, 852, 855; 454/162, 164, 454/165
See application file for complete search history.

(56) References Cited

U.S. PATENT DOCUMENTS

| | | | |
|---|---|---|---|
| 1,634,949 A | * | 7/1927 | Le Valley .............. 137/512.15 |
| 3,416,562 A | | 12/1968 | Freeman |
| 5,431,290 A | | 7/1995 | Vinciguerra |
| 5,634,229 A | | 6/1997 | Stoltz |
| 5,669,410 A | | 9/1997 | Furuya |
| 5,695,397 A | * | 12/1997 | Frank et al. ................ 454/164 |
| 5,794,654 A | * | 8/1998 | Marvonek et al. ...... 137/512.15 |
| 5,904,618 A | * | 5/1999 | Lewis ........................ 454/162 |
| 6,357,473 B1 | * | 3/2002 | Porter et al. ........... 137/512.15 |
| 6,468,148 B1 | * | 10/2002 | Furusawa et al. ........... 454/164 |
| 6,648,749 B2 | * | 11/2003 | Hayashi et al. ............. 454/162 |
| 2002/0164943 A1 | * | 11/2002 | Misner ...................... 454/164 |
| 2003/0019527 A1 | * | 1/2003 | Oppermann et al. ... 137/512.15 |

FOREIGN PATENT DOCUMENTS

EP   0874182   10/1998

* cited by examiner

*Primary Examiner*—Ramesh Krishnamurthy
(74) *Attorney, Agent, or Firm*—Tarolli, Sundheim, Covell & Tummino LLP (57) ABSTRACT

A pressure relief valve (12) for relieving air pressure from a passenger compartment (14) of a vehicle (10) includes a base (18) having a peripheral portion (30). A central opening (42) extends through the peripheral portion (30). The pressure relief valve (12) also includes a plurality of flaps (74) for closing the central opening (42) of the base (18). Each flap (74) has an outer end (82) connected with the peripheral portion (30) of the base (18) and an inner end (80) that is movable relative to the peripheral portion (30) and the other flaps (74) for enabling airflow through the central opening (42). Each flap (74) has opposite surfaces (76 and 78) against which air pressure acts. Differential air pressure acts on the opposite surfaces (76 and 78) causing the flap (74) to move to enable airflow through the central opening (42).

14 Claims, 6 Drawing Sheets

VEHICLE PRESSURE RELIEF VALVE HAVING PERIPHERALLY SECURED FLAPS AND METHOD OF MANUFACTURING THE SAME

TECHNICAL FIELD

The present invention relates to a pressure relief valve and a method of manufacturing the same. More particularly, the present invention relates to a pressure relief valve for relieving pressure from a passenger compartment of a vehicle and the method of manufacturing the pressure relief valve.

BACKGROUND OF THE INVENTION

Pressure relief valves for relieving pressure from a passenger compartment of a vehicle are known. Conventional pressure relief valves include a gate that opens when a differential air pressure between the passenger compartment of the vehicle and atmosphere reaches a predetermined level. For example, when a vehicle door is slammed closed, the air pressure within the passenger compartment is likely to increase suddenly. In response to an increase in air pressure within the passenger compartment, the gate of the pressure relief valve is actuated into an open position to relieve the pressure within the passenger compartment. The conventional pressure relief valve is a one-way valve that only allows airflow from the passenger compartment to atmosphere and prevents airflow from atmosphere into the passenger compartment.

SUMMARY OF THE INVENTION

The present invention relates to a pressure relief valve for relieving air pressure from a passenger compartment of a vehicle. The pressure relief valve comprises a base having a peripheral portion. A central opening extends through the peripheral portion. The pressure relief valve also comprises a plurality of flaps for closing the central opening of the base. Each flap has an outer end connected with the peripheral portion of the base and an inner end that is movable relative to the peripheral portion and the other flaps for enabling airflow through the central opening. Each flap has opposite surfaces against which air pressure acts. Differential air pressure acts on the opposite surfaces causing the flap to move to enable airflow through the central opening.

The present invention also relates to a method of forming a pressure relief valve for relieving air pressure from a passenger compartment of a vehicle. During the method, a base having a peripheral portion and a central opening that extends through the peripheral portion is provided. The central opening of the base is closed with a plurality of flaps. An outer end of each flap is connected with the peripheral portion of the base. Airflow through the central opening is enabled by causing an inner end of each flap to move relative to the peripheral portion and the other flaps due to differential air pressure acting on opposite surfaces of the flap.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
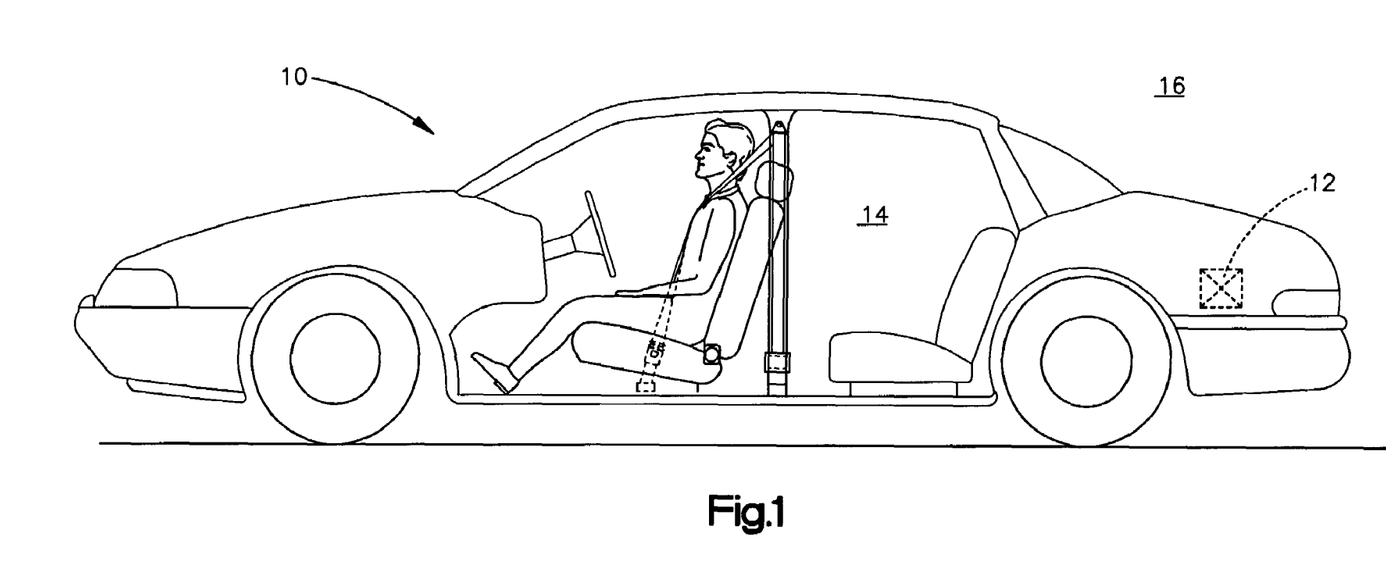
FIG. 1 is a partially cutaway side view of a vehicle including a pressure relief valve constructed in accordance with the present invention.

FIG. 1 is a side view of a vehicle 10 including a pressure relief valve 12 constructed in accordance with the present invention. The pressure relief valve 12 separates the passenger compartment 14 of the vehicle 10 from atmosphere 16 and is operable to relieve pressure from the passenger compartment of the vehicle. In FIG. 1, the pressure relief valve 12 is located in the trunk of the vehicle 10. The pressure relief valve 12 may be located at other location on the vehicle 10.

Figure 2:
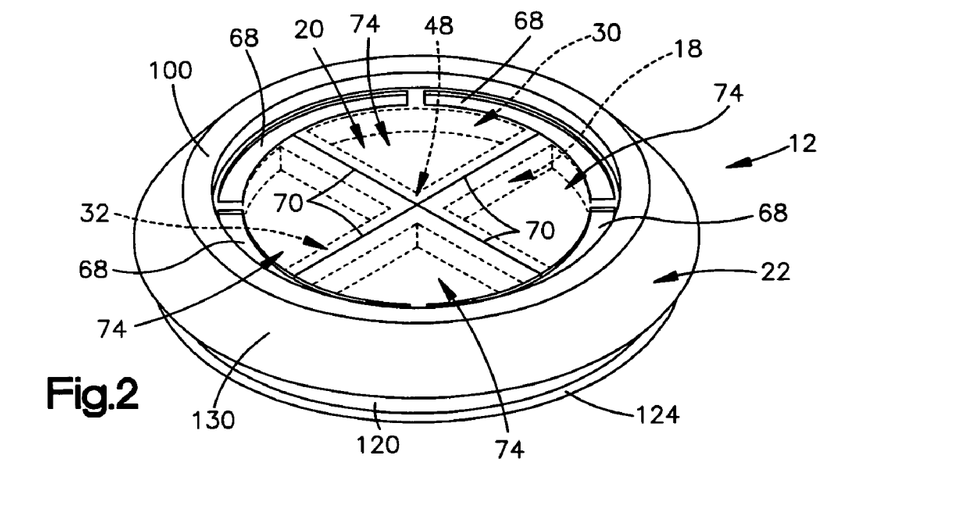
FIG. 2 is a perspective view of a pressure relief valve constructed in accordance with the present invention.
Figure 5:
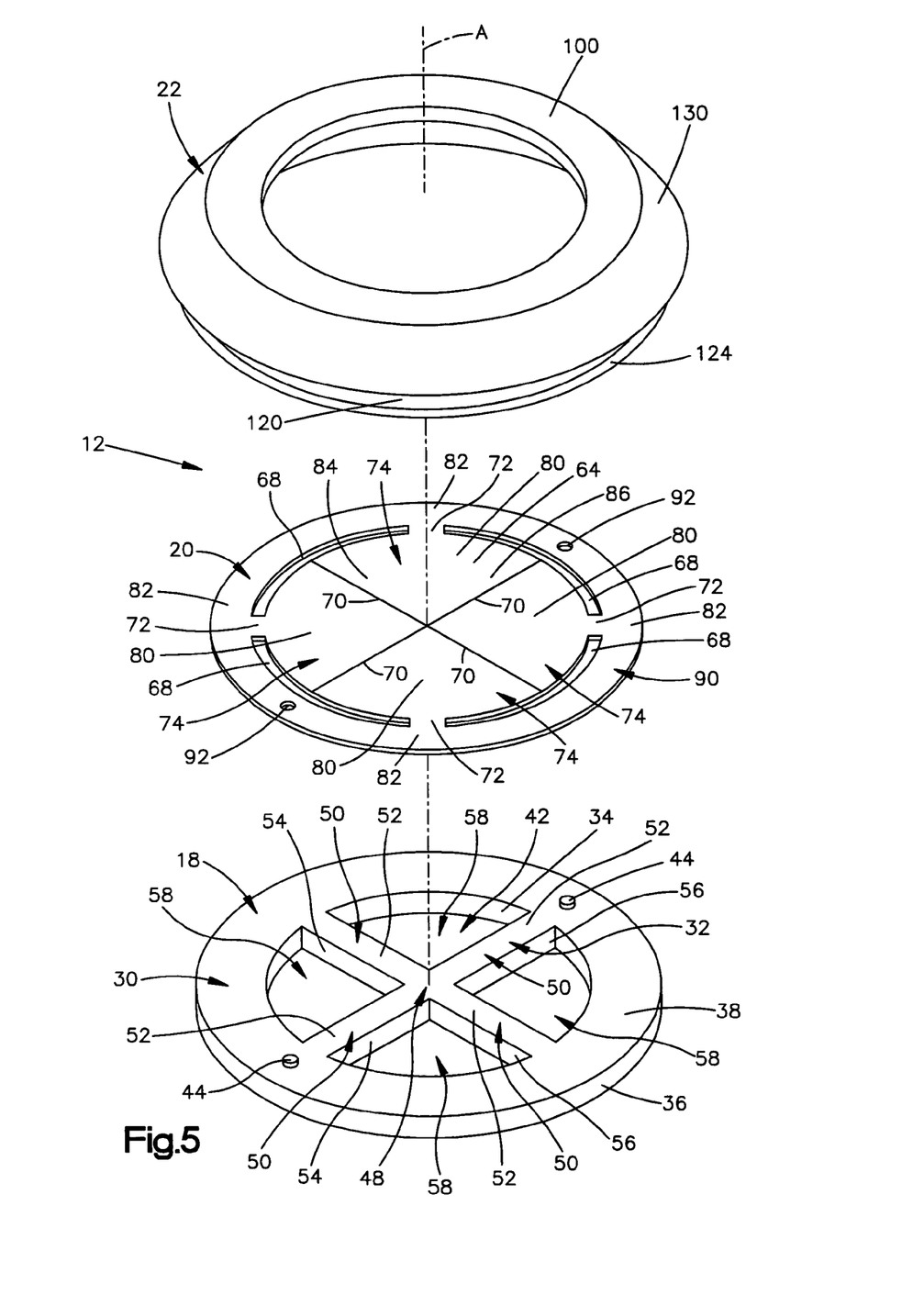
FIG. 5 is an exploded perspective view of the pressure relief valve of FIG. 2.

FIG. 2 illustrates a perspective view of an exemplary embodiment of a pressure relief valve 12 constructed in accordance with the present invention. An exploded perspective view of the pressure relief valve 12 of FIG. 2 is shown in FIG. 5. The pressure relief valve 12 includes a base 18, a flexible closure member 20, and a rim 22.

The base 18 includes a peripheral portion 30 and a support portion 32. The peripheral portion 30 of the base 18 illustrated in FIG. 5 is annular. The peripheral portion 30 of the base 18 may be a shape other than annular. For example, the peripheral portion 30 may be elliptical or rectangular.

Figure 4:
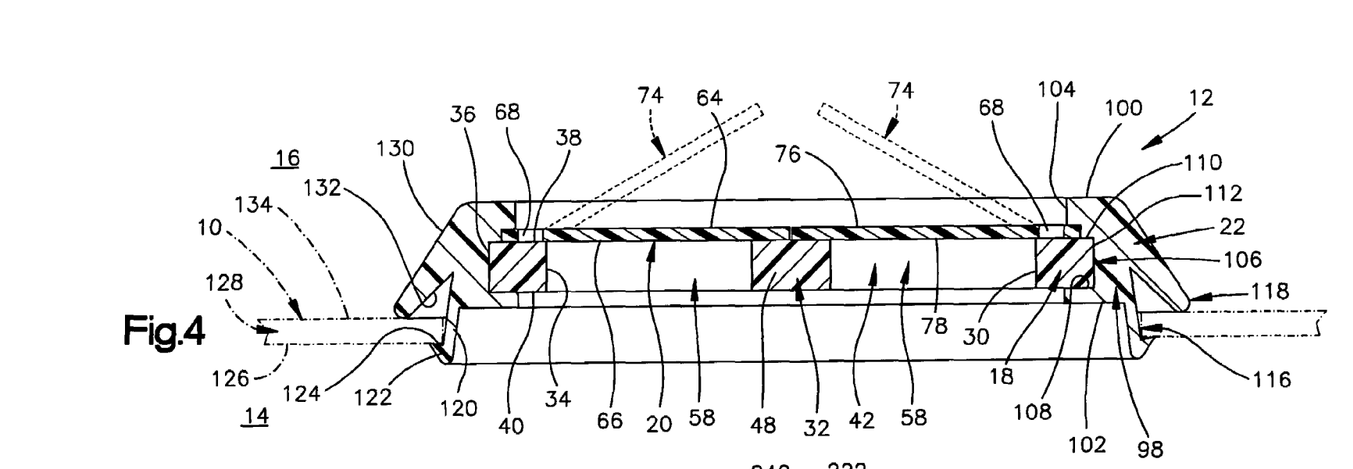
FIG. 4 is a view taken along line 4-4 in FIG. 3.

As shown in FIG. 4, the peripheral portion 30 includes radial inner and outer surfaces 34 and 36, respectively, and upper and lower surfaces 38 and 40, respectively. The surfaces 34, 36, 38, and 40 of the peripheral portion 30 collectively define a rectangular cross-section of the peripheral portion 30. The radial outer surface 36 of the peripheral portion 30 defines a diameter of the base 18 and is centered on axis A, shown in FIG. 5. The radial inner surface 34 of the peripheral portion 30 extends parallel to and is coaxial with the radial outer surface 36. The radial inner surface 34 defines a central opening 42 that extends through the peripheral portion 30 of the base 18. The central opening 42 of the base 18 illustrated in FIG. 4 has a diameter of approximately eighty-five percent the diameter of the base.

The upper surface 38 of the peripheral portion 30 connects the radial inner and outer surfaces 34 and 36 and extends radially relative to axis A. As shown in FIG. 5, two bosses 44 extend outwardly of the upper surface 38 of the peripheral portion 30 of the base 18. The two bosses 44 illustrated in FIG. 5 align with one another on opposite sides of axis A. Each boss 44 is centrally located on the upper surface 38 of the peripheral portion 30 between the radial inner and outer surfaces 34 and 36. The lower surface 40 of the peripheral portion 30 also connects the radial inner and outer surfaces 34 and 36. The lower surface 40 extends parallel to the upper surface 38 and radially relative to axis A.

The support portion 32 of the base 18 includes a central portion 48 and a plurality of radially extending branches 50. The support portion 32 for the base 18 illustrated in FIG. 5 includes four radially extending branches 50. The central portion 48 is located at the center of the central opening 42. The four radially extending branches connect the central portion 48 of the support portion 32 to the peripheral portion 30.

Each radially extending branch 50 of the support portion of the base includes an upper surface 52 and a lower surface (not shown) and first and second side surfaces 54 and 56, respectively. The upper surface 52 of each branch 50 aligns with and extends parallel to the upper surface 38 of the peripheral portion 30 of the base 18. Likewise, the lower surface of each branch 50 aligns with and extends parallel to the lower surface 40 of the peripheral portion 30 of the base 18. The first and second side surfaces 54 and 56 extend parallel to one another and have radially outermost ends which join or mate with the radially inner surface 34 of the peripheral portion 30 of the base 18. Each branch 50 of the support portion 32 has a rectangular cross-section.

The branches 50 of the support portion 32 of the base 18 divide the central opening 42 into a plurality of flow openings 58. The number of flow openings 58 is equal to the number of branches 50. Thus, the four branches 50 of the support portion 32 of FIG. 5 divide the central opening 42 into four flow openings 58. Three surfaces define each flow opening 58 in the base 18. The three surfaces include a portion of the radial inner surface 34 of the peripheral portion 30, a first side surface 54 of one branch 50, and a second side surface 56 of an adjacent branch 50. Thus, the four flow openings 58 in the base 18 are sectors of the central opening 42 that extends through the peripheral portion 30 of the base 18.

The flexible closure member 20 of the pressure relief valve 12 is circular and includes opposite upper and lower surfaces 64 and 66, respectively, (FIG. 4). A center of the flexible closure member 20 is located on axis A.

Four arcuate slots 68 extend through the flexible closure member 20 illustrated in FIG. 5. The four arcuate slots 68 are spaced equidistance from axis A and are positioned in a spaced array about axis A. A distance between arcuate slots 68 located on opposite sides of axis A is approximately eighty-five percent of the diameter of the flexible closure member 20. A slit 70 extends from the middle of each arcuate slot 68 to the center of the flexible closure member 20. Thus, the flexible closure member 20 of FIG. 5 includes four slits 70. The four slits 70 meet with one another at axis A. A narrow portion 72 (FIG. 5) of the flexible closure member 20 separates adjacent arcuate slots 68 from one another. The flexible closure member 20 of FIG. 5 includes four narrow portions 72.

The flexible closure member 20 includes a plurality of flaps 74. The flexible closure member 20 shown in FIGS. 2, 3, and 5 includes four flaps 74. Each flap 74 forms a sector of the flexible closure member 20 and includes upper and lower surfaces 76 and 78, respectively (FIG. 4). Each flap 74 has an inner end 80 (FIG. 5) and an outer end 82 (FIG. 5). The inner end 80 of each flap 74 is defined between adjacent slits 70 in the flexible closure member 20. The inner end 80 narrows as it extends away from the outer end 82 and toward axis A. The inner end 80 of each flap 74 is defined between first and second side portions 84 and 86, respectively, shown on an exemplary flap 74 in FIG. 5. The outer end 82 of each flap 74 is interconnected to the outer end 82 of each adjacent flap 74 so that the outer ends of the plurality of flaps, collectively, form an undivided outer periphery 90 of the flexible closure member 20. One of the four narrow portions 72 is associated with each flap 74 and connects the inner end 80 of the flap 74 to the outer end 82 of the flap. The narrow portion 72 forms a hinge for enabling the inner end 80 of the flap 74 to move relative to the outer end 82 of the flap.

The flexible closure member 20 also includes two alignment holes 92. The alignment holes 92 are located in the outer periphery 90 of the flexible closure member 20. The alignment holes 92 of in the flexible closure member 20 illustrated in FIG. 5 align with one another on opposite sides of axis A and are aligned with two of the slits 70 in the flexible closure member. Each of the alignment holes 92 in the flexible closure member 20 is located at a distance from axis A to receive an associated boss 44 of the base 18.

The rim 22 of the pressure relief valve 12 has an annular main body portion 98 (FIG. 4) that is centered on axis A. The main body portion 98 includes an upper surface 100, a lower surface 102, and an annular inner surface 104. A diameter of the annular inner surface 104 is less than the diameter of the radial outer surface 36 of the peripheral portion 30 of the base 18. The diameter of the annular inner surface 104 is greater than the diameter between radially outermost portions of the arcuate slots 68 of the flexible closure member 20.

An annular pocket 106 extends into the annular inner surface 104 of the main body portion 98 and the rim 22. The annular pocket 106 is defined between a lower surface 108 and an upper surface 110. An annular inner surface 112 defines a bottom of the annular pocket 106.

Interior and exterior locking members 116 and 118, respectively, extend from the main body portion 98 of the rim 22. The interior locking member 116 is annular and includes a spacer portion 120 and a hooked portion 122. The spacer portion 120 extends downwardly, as viewed in FIG. 4, and slightly radially outwardly from the main body portion 98 of the rim 22. The hooked portion 122 of the interior locking member 116 is formed on an end of the spacer portion 120 opposite the main body portion 98 of the rim 22. The hook portion 122 extends radially outwardly from the spacer portion 120 and includes a surface 124 for engaging and sealing against an interior surface 126 of a panel 128 (shown by dashed lines in FIG. 4) of the vehicle 10.

The exterior locking member 118 of the rim is an annular tapered member that extends downwardly, as viewed in FIG. 4, and radially outwardly of the main body portion 98 of the rim 22. The exterior locking member 118 includes upper and lower surfaces 130 and 132, respectively. The upper surface 130 of the exterior locking member 118 extends downwardly and radially outwardly from the upper surface 100 of the main body portion 98 of the rim 22. The lower surface 132 of the exterior locking member 118 terminates near a midpoint of the main body portion 98. The exterior locking member 118 narrows as it extends downwardly and radially outwardly from the main body portion 98 of the rim 22. The exterior locking member 118 is flexible and is designed to engage and seal against an exterior surface 134 of a panel 128 (shown by dashed lines in FIG. 4) of the vehicle 10.

The pressure relief valve 12 of the present invention is manufactured in a two-shot molding process. Prior to the molding process, the flexible closure member 20 is manufactured. The flexible closure member 20 may be made from a Mylar film, polyester, or a polycarbonate-based material. Preferably, the flexible closure member 20 is formed from a single piece of sheet material having a thickness in the range of 3-7 thousandths of an inch. The flexible closure member 20 may be stamped or thermoformed from the single piece of sheet material.

The two-shot molding process may be performed in a single two-shot injection molding machine or, alternatively, may be performed in two separate, one-shot injection molding machines. The first shot of the injection molding process forms the base 18 of the pressure relief valve 12. The base 18 is formed as a monolithic structure that is free from any connecting devices or fasteners. The base 18 is formed from a homogenous material, preferably a polypropylene or thermoplastic and has a uniform density throughout.

Figure 3:
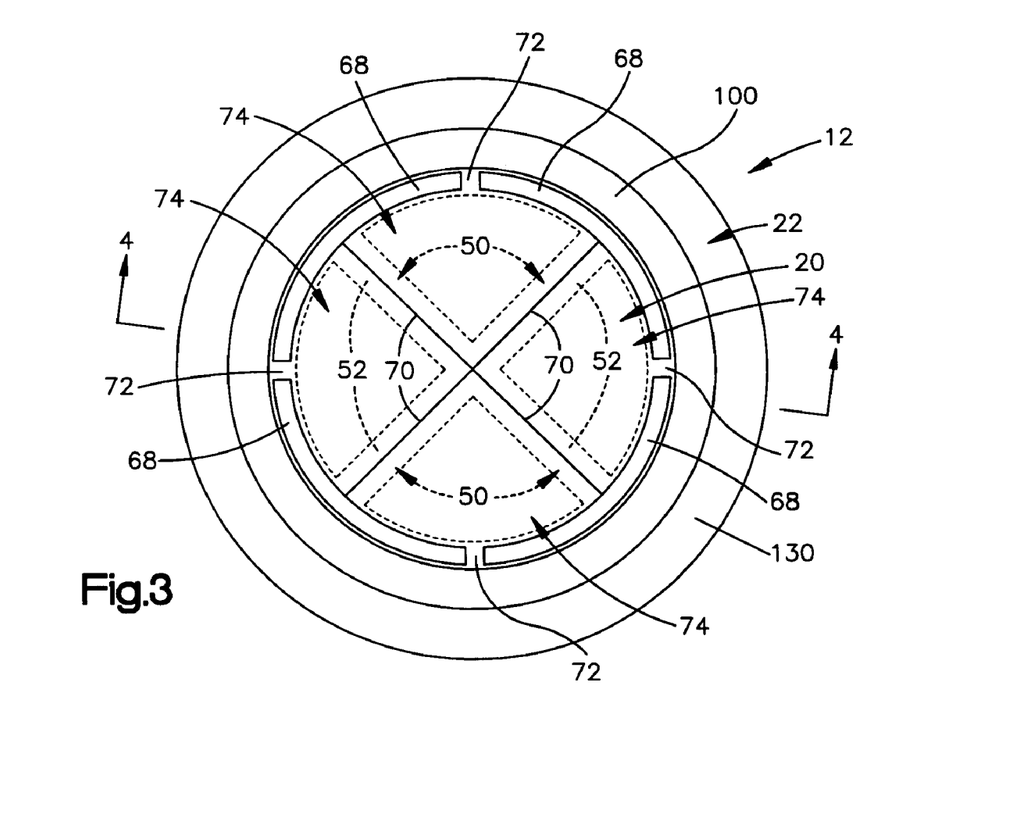
FIG. 3 is a plan view of the pressure relief valve of FIG. 2.

After the base 18 is molded, the flexible closure member 20 is placed on the base 18. The flexible closure member 20 is placed over the base 18 so that the alignment holes 92 in the flexible closure member 20 receive the bosses 44 on the upper surface 38 of the peripheral portion 30 of the base 18. When the alignment holes 92 in the flexible closure member 20 receive the bosses 44 of the base 18, the outer periphery 90 of the flexible closure member 20 overlies the upper surface 38 of the peripheral portion 30 of the base 18. As a result, each flap 74 of the flexible closure member 20 covers or closes an associated flow opening 58 in the base 18 and the slits 70 that separate adjacent flaps 74 of the flexible closure member 20 are positioned on an upper surface 38 of an associated branch 50 of the support portion 32 of the base 18, as is shown in FIGS. 2 and 3. When a slit 70 that separates adjacent flaps 74 of the flexible closure member 20 is positioned on an upper surface 38 of an associated branch 50, the upper surface 38 of the associated branch 50 also supports adjacent side portions 84 and 86 of adjacent flaps 74.

The second shot of the injection molding process forms the rim 22 of the pressure relief valve 12. The rim 22 is also formed as a monolithic structure that is free from any connecting devices or fasteners. The rim 22 is formed from a homogenous material, preferably a thermoplastic elastomer, and has a uniform density throughout. An exemplary thermoplastic elastomer would be a TPV (thermoplastic vulcanizate) such as SANTOPRENE.

The peripheral portion 30 of the base 18 and the outer periphery 90 of the flexible closure member 20, which at this time overlies the upper surface 38 of the peripheral portion 30 of the base 18, form a portion of a mold for forming the rim 22. Thus, the material used to form the rim 22 must have a melting point that is lower than the melting points of the materials of the base 18 and the flexible closure member 20.

The rim 22 is molded directly onto the peripheral portion 30 of the base 18 and outer periphery 90 of the flexible closure member 20. The rim 22 fixedly secures the outer periphery 90 of the flexible closure member 20, i.e., the outer ends 82 of the flaps 74, relative to the peripheral portion 30 of the base 18. The molded rim 22 chemically bonds to the peripheral portion 30 of the base 18. Alternatively, a mechanical bond may be formed between the rim 22 and the peripheral portion 30 of the base 18 using known methods.

As shown in FIG. 4, the rim 22 terminates at the annular inner surface 104 in a position radially outward of the arcuate slots 68 of the flexible closure member 20. The manufacture of the pressure relief valve 12 of the present invention is complete after the rim 22 is formed.

The pressure relief valve 12 of the present invention acts as a check valve or one-way valve. The pressure relief valve 12 enables airflow from the passenger compartment 14 of the vehicle 10 to atmosphere 16, but prevents airflow from atmosphere 16 into the passenger compartment 14 of the vehicle 10. By preventing airflow from atmosphere 16 into the passenger compartment 14 of the vehicle 10, the pressure relief valve 12 of the present invention helps to prevent atmospheric noise, dust, and carbon monoxide from entering the passenger compartment 14 of the vehicle 10.

The pressure relief valve 12 of the present invention is operable in response to differential air pressure between the passenger compartment 14 of the vehicle 10 and atmosphere 16. FIG. 4 illustrates the location of the passenger compartment 14 and atmosphere 16 relative to the pressure relief valve 12 when mounted to a panel 128 of the vehicle 10. FIG. 4 also illustrates the pressure relief valve 12 in a closed condition. The flaps 74 of the flexible closure member 20 have a tendency to remain flat. Thus, when air pressure within the passenger compartment 14 of the vehicle 10 and atmospheric pressure 16 are equal, the pressure relief valve 12 will remain in a closed condition.

When atmospheric pressure increased above the air pressure within the passenger compartment 14 of the vehicle 10, the atmospheric pressure acts downwardly, as viewed in FIG. 4, against the flaps 74 of the flexible closure member 20. Since each flap 74 is supported on the upper surfaces 52 of adjacent branches 50 of the support portion 32 of the base 18, the inner ends 80 of the flaps 74 of the flexible closure member 20 remain in the closed condition and do not move relative to the base 18. As a result, airflow from the atmosphere 16 into the passenger compartment 14 of the vehicle 10 is prevented.

When the air pressure within the passenger compartment 14 of the vehicle 10 increased above atmospheric pressure, the air pressure within the passenger compartment 14 acts upwardly, as viewed in FIG. 4, against the flaps 74 of the flexible closure member 20. When the air pressure within the passenger compartment 14 is greater than atmospheric pressure by a predetermined level, i.e., a level to overcome the tendency of the flaps 74 to remain flat, the inner ends 80 of the flaps 74 move upwardly, as viewed in FIG. 4, to enable airflow from the passenger compartment 14 to atmosphere 16. When the inner ends 80 of the flaps 74 move to enable airflow from the passenger compartment 14 to atmosphere 16, the flaps 74 are in an open condition. Dashed lines in FIG. 4 illustrate the open condition of the flaps 74. When the differential air pressure between the passenger compartment 14 of the vehicle 10 and atmosphere 16 falls below the predetermined level, the tendency of the flaps 74 to remain flat causes the flaps 74 to move back into the closed condition. The tendency of the flaps 74 to remain flat, biases the flaps 74 into the closed condition. As a result, the pressure relief valve 12 operates independent of gravity and may be mounted on the vehicle 10 in any orientation.

Figure 6:
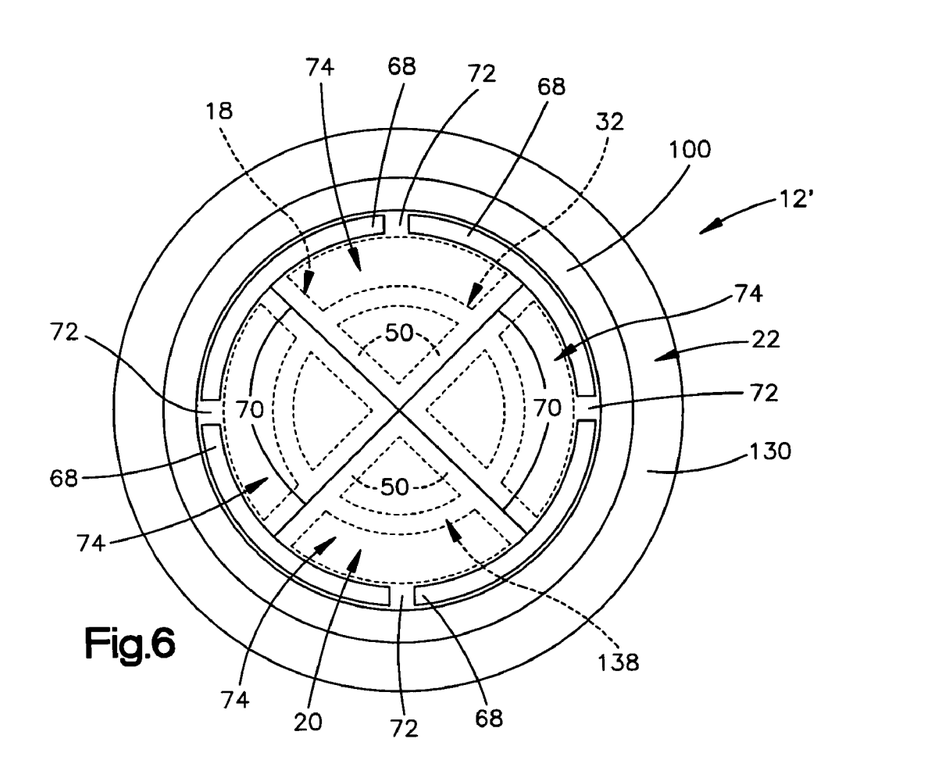
FIG. 6 is a plan view of a pressure relief valve constructed in accordance with a second embodiment of the present invention.

FIG. 6 is a plan view of a pressure relief valve 12' constructed in accordance with a second embodiment of the present invention. Structure of the pressure relief valve 12' of FIG. 6 that are similar to or perform the same function as structure of the pressure relief valve 12 illustrated in FIGS. 2-5 are referred to using the same reference numbers.

Figure 7:
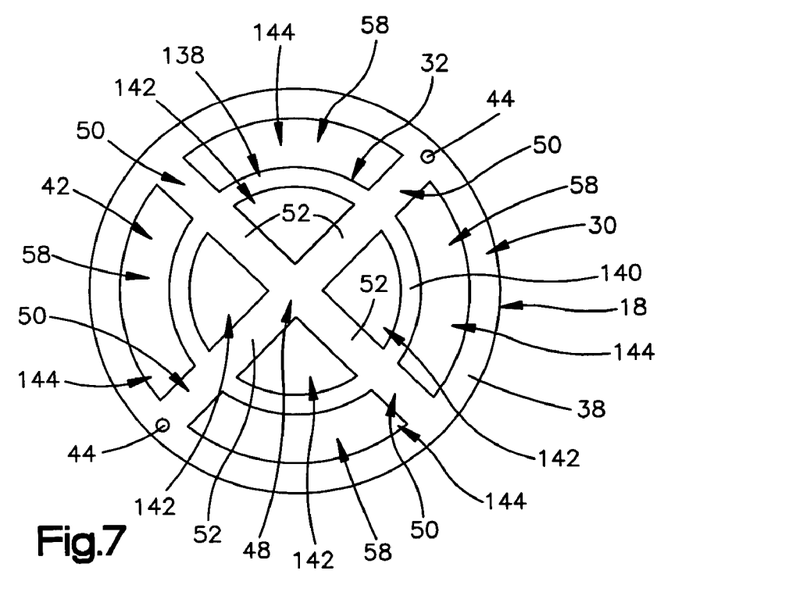
FIG. 7 is a plan view of a portion of the pressure relief valve of FIG. 6.

The pressure relief valve 12' of FIG. 6 is identical to the pressure relief valve 12 of FIGS. 2-5 with the exception that the support portion 32 of the base 18 has been modified. FIG. 7 is a plan view of the base 18 for the pressure relief valve 12' of FIG. 6. The support portion 32 of the base 18 of the pressure relief valve 12' of FIG. 6 includes an annular support portion 138 that is located radially outwardly of the central portion 48 and that interconnects the plurality of radially extending branches 50.

The annular support portion 138 is coaxial with the peripheral portion 30 of the base 18 and includes an upper surface 140 (FIG. 7) that extends parallel to and aligns with the upper surfaces 52 of each of the radially extending branches 50. The annular support portion 138 divides each flow opening 58 into a sector shaped flow opening 142 and an arcuate flow opening 144. The annual support portion 138 of the base 18 provides additional support for the inner end 80 of each flap 74 when the flap is in the closed condition and provides further resistance against airflow from atmosphere 16 into the passenger compartment 14 of the vehicle 10.

Figure 8:
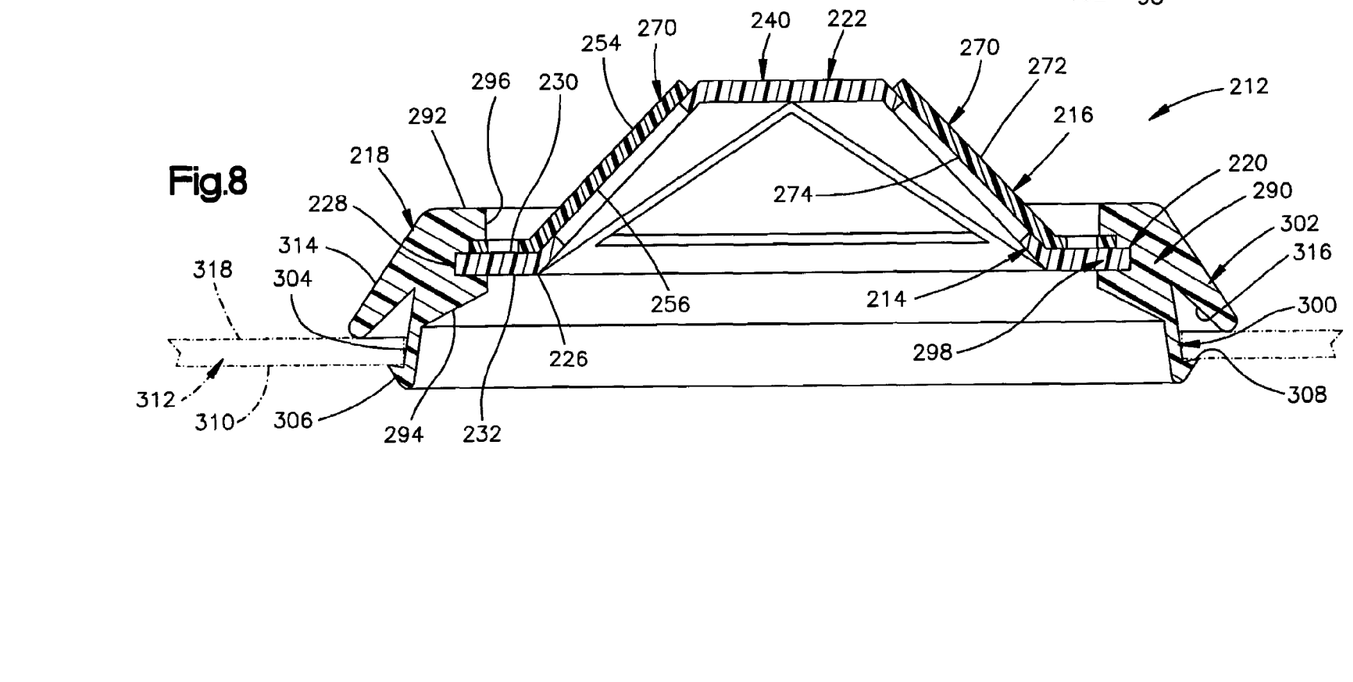
FIG. 8 is a cutaway view of a pressure relief valve constructed in accordance with a third embodiment of the present invention.

FIG. 8 is a cutaway view of a pressure relief valve 212 constructed in accordance with a third embodiment of the present invention. Since the pressure relief valve 212 of FIG. 8 operates in substantially the same manner as the pressure relief valve 12 of FIGS. 2-5, operation of the pressure relief valve 212 of FIG. 8 is not discussed below.

Figure 9:
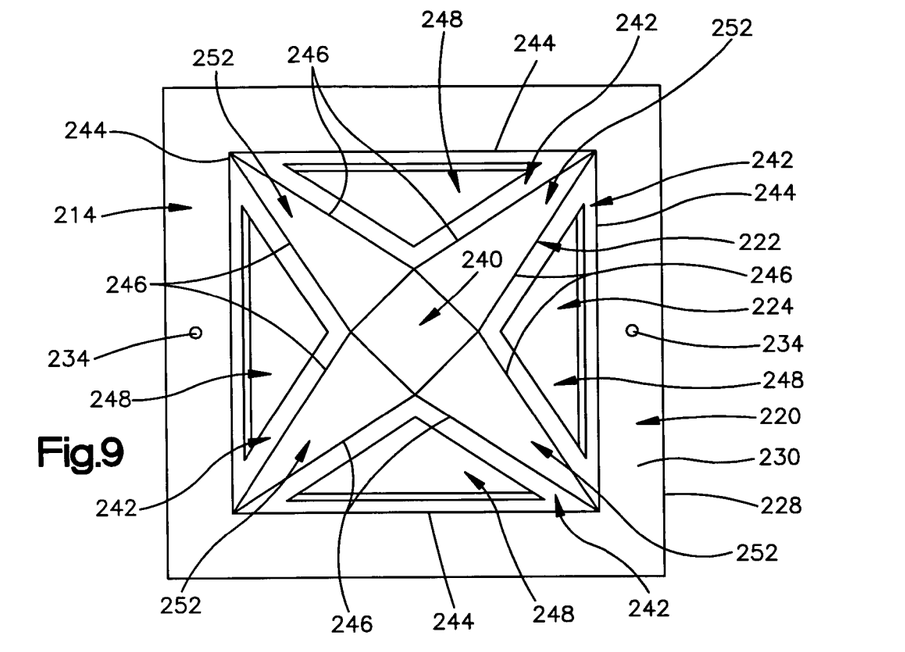
FIG. 9 is a plan view of a first portion of the pressure relief valve of FIG. 8.

The pressure relief valve 212 of FIG. 8 includes a base 214, a flexible closure member 216, and a rim 218. FIG. 9 is a plan view of the base 214 of the pressure relief valve 212 of FIG. 8. The base 214 includes a peripheral portion 220 and a support portion 222.

The peripheral portion 220 of the base 214 illustrated in FIG. 9 is square. Alternatively, the peripheral portion 220 of the base 214 may be other shapes, such as a circle or a rectangle. A square-shaped central opening 224 extends through a center of the peripheral portion 220 of the base 214. An interior surface 226 (FIG. 8) of the peripheral portion 220 defines the opening 224. The interior surface 226 includes four linearly extending surfaces that collectively define the square shaped central opening 224. The peripheral portion 220 of the base 214 also includes an exterior surface 228, an upper surface 230, and a lower surface 232.

The upper surface 230 of the peripheral portion 220 connects the interior and exterior surfaces 226 and 228. The upper surface 230 extends perpendicular to the exterior surface 228 of the peripheral portion 220 and is generally planar. Two bosses 234 extend outwardly of the upper surface 230 of the peripheral portion 220 of the base 214. The two bosses 234 are located on opposite sides of the central opening 224 relative to one another. Each boss 234 is centrally located on the upper surface 230 of the peripheral portion 220 between the interior and exterior surfaces 226 and 228. The lower surface 232 of the peripheral portion 220 also connects the interior and exterior surfaces 226 and 228. The lower surface 232 extends parallel to the upper surface 230 and is generally planar.

The support portion 222 of the base 214 extends upwardly, as viewed in FIG. 8, out of a plane of the peripheral portion 220 of the base 214. The support portion 222 of the base 214 includes a central wall portion 240 that is square and is rotated forty-five degree relative to the square peripheral portion 220 of the base 214, as is shown in FIG. 9. The width of the central wall portion 240 is approximately one-fourth the width of the central opening 224 in the peripheral portion 220 of the base 214. The central wall portion 240 is planar and is located in a plane that extends parallel to the plane of the peripheral portion 220 of the base 214.

The support portion 222 also includes four triangular wall portions 242 that connect the peripheral portion 220 to the central wall portion 240 of the support portion 222. Each triangular wall portion 242 includes a peripheral surface 244 and two side surfaces 246. The two side surfaces 246 of each of the triangular wall portions 242 have equal lengths. Thus, each triangular wall portion 242 forms either an isosceles triangle or an equilateral triangle. A triangular opening 248 extends through each of the triangular wall portions 242.

The peripheral surface 244 of each triangular wall portion 242 connects to an associated linearly extending surface of the interior surface 226 of the peripheral portion 220. A vertex of the side surfaces 246 of the triangular wall portion 242 is connected with a corner of the central wall portion 240 of the support portion 222 of the base 214. Thus, each of the triangular wall portions 242 connects the peripheral portion 220 to the central wall portion 240 of the support portion 222. Since the central wall portion 240 has a smaller width than the central opening 224 in the peripheral portion 220, the support portion 222 of the base 214 tapers inwardly as each triangular wall portion 242 extends toward the central wall portion 240.

The support portion 222 of the base 214 also includes four triangular spacer portions 252. The spacer portions 252 connect adjacent triangular wall portions 242. Thus, one spacer position 252 is interposed between each pair of adjacent triangular wall portions 242. Each spacer portion 252 connects to a linear surface of the central wall portion 240 and extends to a corner of the interior surface 226 of the peripheral portion 220 of the base 214. Each spacer portion 252 is planar and is angled by forty-five degrees relative to each of the adjacent triangular wall portions 242. Since the spacer portions 252 connect adjacent triangular wall portions 242, the only openings through the support portion 222 of the base 214 are the triangular openings 248 located in the triangular wall portions 242.

Figure 10:
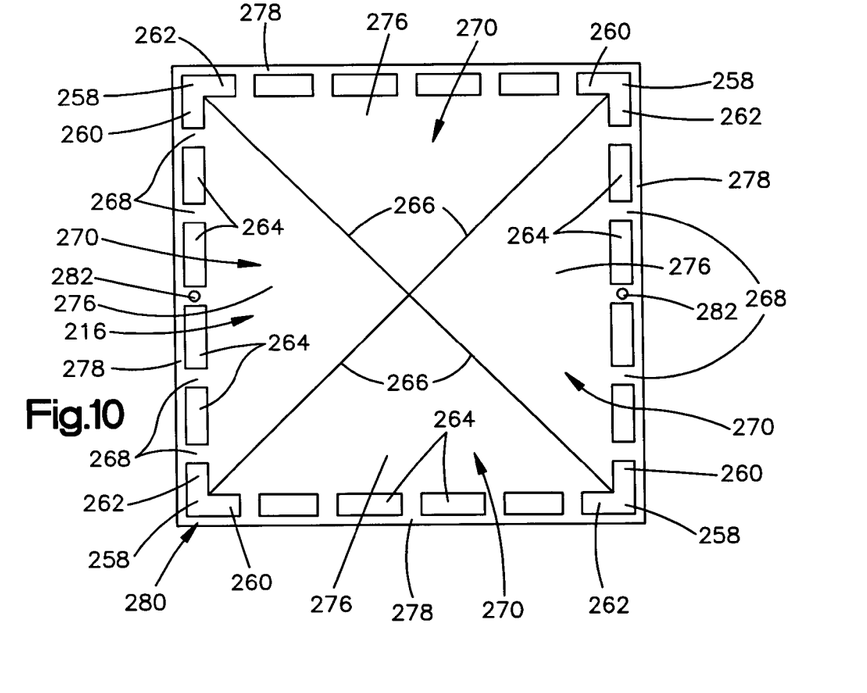
FIG. 10 is a plan view of a second portion of the pressure relief valve of FIG. 8.

FIG. 10 illustrates the flexible closure member 216 for the pressure relief valve 212 of FIG. 8. The flexible closure member 216 is square and includes opposite upper and lower surfaces 254 and 256, respectively (FIG. 8). A width of the flexible closure member 216 is slightly less than a width of the peripheral portion 220 of the base 214, as is shown in FIG. 8.

A plurality of slots extends through the flexible closure member 216. An angled slot 258 is located adjacent each corner of the flexible member 216. Each angled slot 258 includes first and second rectangular portions 260 and 262, respectively, that are angled ninety-degrees from one another. Four rectangular slots 264 are located between each of the angled slot 258. A slit 266 extends from the middle of each angled slot 258 to the center of the flexible closure member 216. Thus, the flexible closure member 216 of FIG. 10 includes four slits 266. The four slits 266 meet at the center of the flexible closure member 216. A narrow portion 268 of the flexible closure member 216 separates adjacent slots from one another. Thus, five narrow portions 268 are located adjacent each side of the square shaped flexible closure member 216.

The flexible closure member 216 shown in FIG. 10 includes four flaps 270. One flap 270 is associated with each triangular wall portion 242 of the support portion 222 of the base 214. Each flap 270 of the flexible closure member 216 is triangular and includes upper and lower surfaces 272 and 274, respectively. Each flap 270 has an inner end 276 and an outer end 278. The inner end 276 of each flap 270 is defined between adjacent slits 266 in the flexible closure member 216. The inner end 276 narrows as it extends away from the outer end 278 and toward the center of the flexible closure member 216. The outer end 278 of each flap 270 is interconnected to the outer end 278 of each adjacent flap 270 so that the outer ends, collectively, form an undivided, square outer periphery 280 of the flexible closure member 216. Each flap 270 includes five narrow portions 268. The five narrow portions 268 connect the inner end 276 of the flap 270 to the outer end 278 of the flap. The narrow portions 268 form hinges for enabling the inner end 276 of the flap 270 to move relative to the outer end 278 of the flap 270.

The flaps 270 of the flexible closure member 216 have a tendency to return to their original position. For example, the flaps 270 of the flexible closure member 216 shown in FIG. 10 have a tendency to remain flat so that the flexible closure member 216 is planar. When assembled onto the base 214, each flap 270 bends at the hinges formed by the narrow portions 268 so that the inner end 276 of each flap 270 overlays its associated triangular wall portion 242 of the base 214 to close a triangular opening 248, while the outer end 278 of each flap 270 overlays the peripheral portion 220 of the base 214. The tendency of the flaps 270 to return to their original position biases the flaps 270 into a closed condition closing the triangular openings 248. As a result, the pressure relief valve 212 operates independent of gravity and may be mounted on the vehicle in any orientation.

The flexible closure member 216 also includes two alignment holes 282. The alignment holes 282 are located in the outer periphery 280 of the flexible closure member 216. The alignment holes 282 in the outer periphery 280 of the flexible closure member 216 illustrated in FIG. 10 are located on opposite flaps 270 from one another. Each of the alignment holes 282 in the flexible closure member 216 is located at a distance for receiving an associated boss 234 of the base 214.

The rim 218 of the pressure relief valve 212 is adapted to surround the peripheral portion 220 of the base 214. The rim 218 has a main body portion 290 that includes an upper surface 292, a lower surface 294, and an inner surface 296. A pocket 298 extends into the inner surface 296 and the rim 218.

Interior and exterior locking members 300 and 302 extend from the main body portion 290 of the rim 218. The interior locking member 300 includes a spacer portion 304 and a hooked portion 306. The spacer portion 304 extends downwardly, as viewed in FIG. 8, and slightly outwardly from the main body portion 290 of the rim 218. The hooked portion 306 of the interior locking member 300 is formed on an end of the spacer portion 304 opposite the main body portion 290 of the rim 218. The hook portion 306 extends outwardly from the spacer portion 304 and includes a sealing surface 308 for engaging and sealing against an interior surface 310 of a panel 312 (shown by dashed lines in FIG. 8) of the vehicle.

The exterior locking member 302 of the rim 218 is a tapered member that extends downwardly, as viewed in FIG. 8, and outwardly of the main body portion 290 of the rim 218. The exterior locking member 302 includes upper and lower surfaces 314 and 316, respectively. The upper surface 314 of the exterior locking member 302 extends downwardly and outwardly from the upper surface 292 of the main body portion 290 of the rim 218. The lower surface 316 of the exterior locking member 302 terminates near a midpoint of the main body portion 290. The exterior locking member 302 narrows as it extends downwardly and outwardly from the main body portion 290 of the rim 218. The exterior locking member 290 is flexible and is designed to engage and seal against an exterior surface 318 of a panel 312 (shown by dashed lines in FIG. 8) of the vehicle.

The pressure relief valve 212 of FIG. 8 is manufactured using the same two-shot molding process as described with reference to the exemplary embodiment of FIGS. 2-5. Prior to the molding process, the flexible closure member 216 may stamped or thermoformed from the single piece of sheet material.

From the above description of the invention, those skilled in the art will perceive improvements, changes and modifications. Such improvements, changes and modifications within the skill of the art are intended to be covered by the appended claims.

Having described the invention, we claim the following:

1. A pressure relief valve for relieving air pressure from a passenger compartment of a vehicle, the pressure relief valve comprising:
    a base having a peripheral portion, a central opening extending through the base; and
    a plurality of flaps for closing the central opening of the base, each flap having an outer end connected with the peripheral portion of the base and an inner end that is movable relative to the peripheral portion and the other flaps for enabling airflow through the central opening;
    each flap having opposite surfaces against which air pressure acts, differential air pressure acting on the opposite surfaces causing the flap to move about a hinge to enable airflow through the central opening, the hinge comprising a narrow portion of material formed between slots in the flap,
    the plurality of flaps being formed in a single sheet of flexible material, the outer ends of the plurality of flaps being interconnected to collectively form an undivided outer periphery of the sheet of flexible material, the inner ends of the plurality of flaps forming a central portion of the sheet of flexible material and being movable relative to the outer periphery.

2. The pressure relief valve of claim 1 wherein the peripheral portion of the base includes first alignment members and the outer periphery of the sheet of flexible material includes second alignment members that are adapted to cooperate with the first alignment members for positioning the sheet of flexible material relative to the base.

3. A method of forming a pressure relief valve for relieving air pressure from a passenger compartment of a vehicle, the method comprising the steps of:
    providing a base having a peripheral portion and a central opening that extends through the base;
    closing the central opening of the base with a plurality of flaps;
    connecting an outer end of each flap with the peripheral portion of the base;
    forming the plurality of flaps in a single sheet of flexible material;
    maintaining an outer periphery of the sheet of flexible material undivided so that the outer ends of the plurality of flaps are interconnected;
    forming inner ends of the plurality of flaps in a central portion of the sheet of flexible material; and
    enabling airflow through the central opening by causing the inner end of each flap to move relative to the peripheral portion and the other flaps due to differential air pressure acting on opposite surfaces of the flap.

4. The method of claim 3 wherein the step of providing a base having a peripheral portion and a central opening further includes the step of injection molding the base.

5. The method of claim 3 wherein the step of providing a base having a peripheral portion and a central opening further includes the steps of providing a support portion of the base that divides the central opening into a plurality of flow openings, and associating a flap of the plurality of flaps with at least one flow opening for closing the at least one flow opening and for moving to enable airflow through the at least one flow opening.

6. The method of claim 5 further including the steps of supporting, with the support portion of the base, the inner end of each flap in a closed condition closing the at least one flow opening, enabling movement of the inner end of each flap in a first direction relative to the support portion, and preventing movement of the inner end of each flap in a second direction, opposite the first direction, relative to the support portion for enabling airflow through the at least one flow opening in only the first direction.

7. The method of claim 5 wherein the steps of providing a base having a peripheral portion and providing a support portion on the base further include the step of molding the base, including the peripheral portion and the support portion, from a homogenous material so that the base is a monolithic structure that is free from any connecting devices and has a uniform density throughout.

8. The method of claim 3 wherein the step of closing the central opening of the base with a plurality of flaps further includes the step of forming at least one hinge in each flap to connect the inner end of the flap with the outer end of the flap for enabling movement of the inner end relative to the outer end.

9. The method of claim 8 wherein the step of forming at least one hinge in each flap includes the step of cutting slots through the flap to form at least one narrow portion of material between slots.

10. The method of claim 3 wherein the step of closing the central opening of the base with a plurality of flaps further includes the step of forming the plurality of flaps from a material having a tendency to return the flaps to a closed condition closing the central opening of the base so as to form a pressure relief valve that is independent of gravity.

11. The method of claim 3 further including the steps of providing first alignment members on the peripheral portion of the base, and providing second alignment members, that are adapted to cooperate with the first alignment members for positioning the sheet of flexible material relative to the base, on the outer periphery of the sheet of flexible material.

12. The method of claim 3 further including the step of molding a rim onto the peripheral portion of the base for fixedly securing the outer end of each flap to the peripheral portion of the molded base.

13. The method of claim 12 wherein the step of molding a rim further includes the step of forming a locking portion on the rim that is adapted to secure the pressure relief valve to a panel of the vehicle and is further adapted to seal against the panel of the vehicle.

14. A pressure relief valve for relieving air pressure from a passenger compartment of a vehicle, the pressure relief valve comprising:
   a base having a peripheral portion, a central portion, and a support portion interposed between the peripheral portion and the central portion, the support portion defining inner and outer flow openings extending through the base; and
   a plurality of flaps for closing the inner and outer flow openings of the base, each flap having an outer end connected with the peripheral portion of the base and an inner end that is movable relative to the peripheral portion and the other flaps for enabling airflow through the inner and outer flow openings,
   each flap having opposite surfaces against which air pressure acts, differential air pressure acting on the opposite surfaces causing the flap to move to enable airflow through the inner and outer flow openings.

* * * * *